United States Patent
Akhmejanov

(10) Patent No.: US 10,569,856 B2
(45) Date of Patent: Feb. 25, 2020

(54) AERODYNAMIC DEVICE

(71) Applicant: Alibi Akhmejanov, Uralsk (KZ)

(72) Inventor: Alibi Akhmejanov, Uralsk (KZ)

( * ) Notice: Subject to any disclaimer, the term of this patent is extended or adjusted under 35 U.S.C. 154(b) by 435 days.

(21) Appl. No.: 15/308,098

(22) PCT Filed: Jul. 9, 2015

(86) PCT No.: PCT/KZ2015/000008
§ 371 (c)(1),
(2) Date: Nov. 1, 2016

(87) PCT Pub. No.: WO2016/022011
PCT Pub. Date: Feb. 11, 2016

(65) Prior Publication Data
US 2017/0050719 A1    Feb. 23, 2017

(30) Foreign Application Priority Data

Aug. 4, 2014    (KZ) .................................. 2014/1053

(51) Int. Cl.
*B64C 3/10* (2006.01)
*B64C 21/10* (2006.01)
(Continued)

(52) U.S. Cl.
CPC .................. *B64C 3/10* (2013.01); *B64C 3/44* (2013.01); *B64C 3/54* (2013.01); *B64C 9/00* (2013.01);
(Continued)

(58) Field of Classification Search
CPC .... B64C 3/10; B64C 3/44; B64C 9/38; B64C 15/14; B64C 21/10; B64C 21/08; B64C 29/0016; B64C 3/141
See application file for complete search history.

(56) References Cited

U.S. PATENT DOCUMENTS

| 2,547,266 A | 4/1951 | Hoglin |
| 2,687,262 A | 8/1954 | Custer |

(Continued)

FOREIGN PATENT DOCUMENTS

| DE | 3807648 | 11/1988 |
| EP | 1988014 | 11/2008 |

(Continued)

OTHER PUBLICATIONS

New Polytechnic Dictionary ed. by A.U. Ishlinsky.—Moscow: Research Publishing "Bolshaya Rossiyskaya Entsiklopediya", 2000.—p. 36, 252.

(Continued)

*Primary Examiner* — Philip J Bonzell
*Assistant Examiner* — Tye William Abell
(74) *Attorney, Agent, or Firm* — Pearl Cohen Zedek Latzer Baratz LLP

(57) ABSTRACT

The invention relates to aviation equipment. An object of this invention is to develop a new aerodynamic device which can extend the range of aerodynamic devices for aviation, increase the efficiency of the air flow power use, increase the efficiency of the lifting force and improve the efficiency of controlling the wing resultant forces. For this purpose, the aerodynamic device has an aerodynamic wing (2) with a blower (1) of gaseous working fluid (such as air) mounted above the wing (2), in accordance with the invention, the aerodynamic wing (2) has a specific shape it is designed in the form of a double-curved open surface made up by a system of longitudinal grooves (7,8) along the whole wing surface The wing (2) has a convergent segment (4) and a divergent segment (6); between the convergent and the divergent segments there is a smooth transitional segment (5). The wing outlines have end elements (11). In the convergent and the divergent segments of the wing lower (Continued)

surface which is not blown by air, there is a controlled drive system (10) for the wing surface cambering and area changing. The divergent segment tip on the wing trailing edge has a deflectable controlled element (9). The structural parts of the present invention meet special conditions.

15 Claims, 15 Drawing Sheets

(51) Int. Cl.
   *B64C 15/14* (2006.01)
   *B64C 29/00* (2006.01)
   *B64C 9/38* (2006.01)
   *B64C 3/44* (2006.01)
   *B64C 3/54* (2006.01)
   *B64C 9/00* (2006.01)
   *B64C 39/02* (2006.01)

(52) U.S. Cl.
   CPC ............ *B64C 9/38* (2013.01); *B64C 15/14* (2013.01); *B64C 21/10* (2013.01); *B64C 29/0016* (2013.01); *B64C 39/024* (2013.01); *Y02T 50/166* (2013.01); *Y02T 50/32* (2013.01)

(56) References Cited

U.S. PATENT DOCUMENTS

| | | | |
|---|---|---|---|
| 2,691,494 A * | 10/1954 | Custer | B64C 39/066 244/12.6 |
| 2,944,762 A | 7/1960 | Lane | |
| 2,961,188 A | 11/1960 | Taylor | |
| 2,978,206 A | 4/1961 | Johnson | |
| 2,996,266 A | 8/1961 | Rebasti | |
| 3,104,853 A | 9/1963 | Klein | |
| 3,276,723 A | 10/1966 | Miller et al. | |
| 3,469,802 A | 9/1969 | Roberts et al. | |
| 3,915,411 A | 10/1975 | Surbaugh | |
| 4,240,598 A | 12/1980 | Espin et al. | |
| 4,392,621 A | 7/1983 | Viets | |
| 4,463,920 A * | 8/1984 | Nichols, Jr. | B64C 9/24 239/265.23 |
| 4,830,315 A | 5/1989 | Presz, Jr. et al. | |
| 5,031,859 A | 7/1991 | Cunningham | |
| 2009/0050734 A1* | 2/2009 | Cook | B64C 9/38 244/99.5 |
| 2009/0108125 A1* | 4/2009 | Shmilovich | B64C 9/38 244/15 |
| 2009/0108141 A1* | 4/2009 | Shmilovich | B64C 3/58 244/207 |

FOREIGN PATENT DOCUMENTS

| | | |
|---|---|---|
| EP | 2597037 | 5/2013 |
| FR | 1212391 | 3/1960 |
| FR | 1281518 | 1/1962 |
| RU | 2061627 | 6/1996 |
| RU | 2095282 | 6/1996 |
| RU | 2089458 | 9/1997 |
| RU | 2163216 | 2/2001 |
| RU | 2184685 | 7/2002 |
| RU | 2187444 | 8/2002 |
| RU | 2288137 | 11/2006 |
| RU | 2374133 | 11/2009 |

OTHER PUBLICATIONS

Loytsyansky, L.G., Fluid Mechanics.—Moscow: Drofa Publishing, 2003, 7th edition, p. 504-507.
Reba I., Wohlthausen E. Applications of the Coanda Effect // Scientific American, vol. 214, Jun. 1966, pp. 84-92; http://www.laesieworks.com/ifo/how/Coanda_effect-P1.html, published Feb. 11, 2010.
Bowers P. Unconventional Aircraft / P. Bowers—Blue Ridge Summit, PA: 1990 (Eng).—Moscow: Mir, 1991 (Rus). pp. 137-138.
GOST 22833-77, Aircraft Geometry Variables, a USSR national standard for geometrical aircraft characteristics, Jan. 1, 1979.
Encyclopedic Dictionary of Physics / ed. by A.M. Prokhorov.—Moscow: Sovetskaya Entsiklopedia, 1983. 928 p.
Krasnov, N.F., Aerodynamics. Part I. Theoretical Framework. Airfoil and Wing Aerodynamics. Technical college textbook.—Moscow, Vysshaya Shkola, 1976. 384 p.
Krasnov, N.F., Aerodynamics. Part II. Aerodynamics Technology. Textbook for technical college students. 3rd edition, revised and enlarged.—Moscow, Vysshaya Shkola, 1980. 416 p.

\* cited by examiner

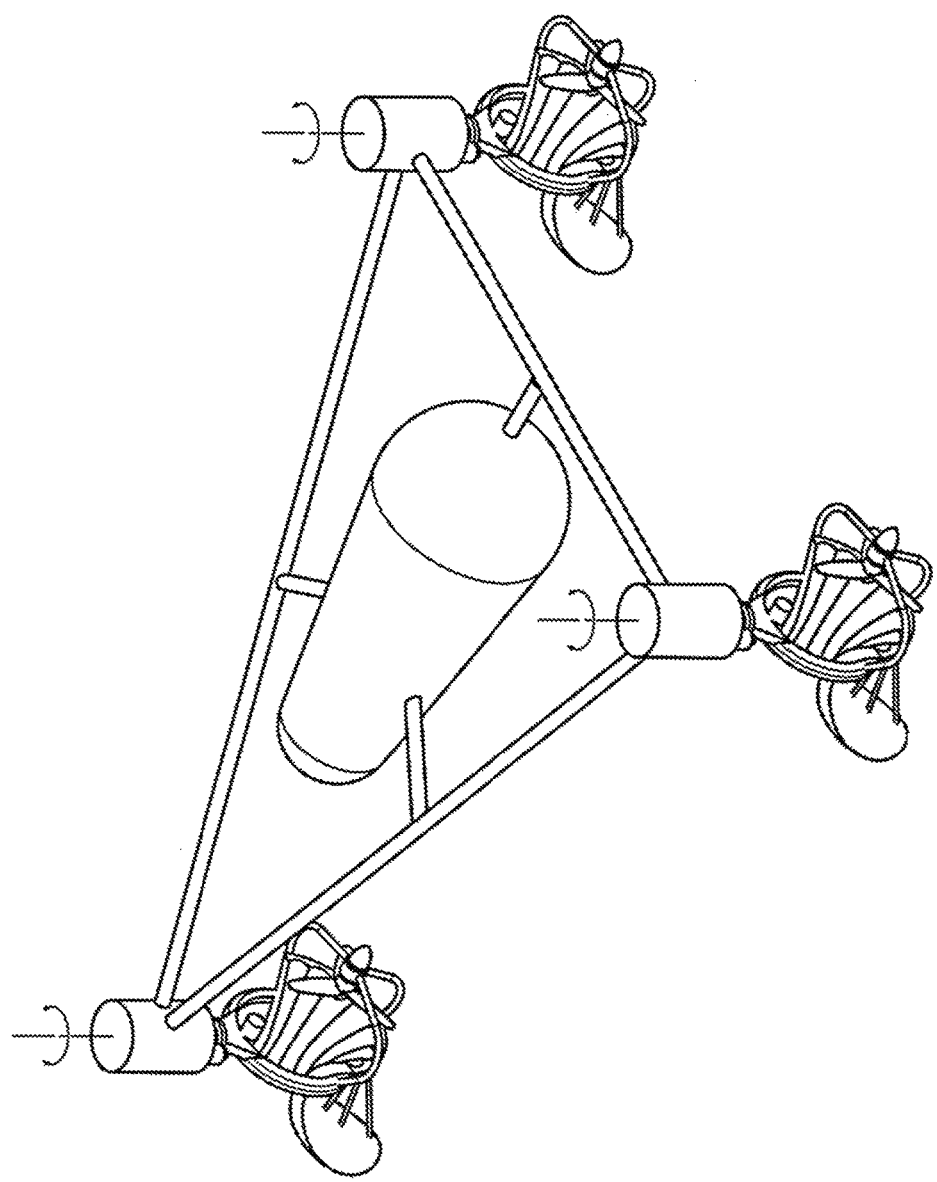

AERODYNAMIC DEVICE

CROSS-REFERENCE TO RELATED APPLICATIONS

This application is a National Phase of International Application No.: PCT/KZ2015/000008, filed Jul. 9, 2015, claiming priority from Kazakhstan Patent Application No. 2014/1053.1, filed Aug. 4, 2014, which is hereby incorporated by reference.

TECHNICAL FIELD

The invention relates to aviation equipment.

BACKGROUND ART

The conventional aerodynamic device used in aircraft in the form of a lift generating airfoil is a wing. The working fluid—air or another gas—flowing around the wing, creates different in magnitude pressures on its upper and lower surfaces caused by different speeds of streams above and below the wing and resulting in creating the lifting force (New Polytechnic Dictionary ed. by A. U. Ishlinsky.—Moscow: Research Publishing "Bolshaya Rossiyskaya Entsiklopediya", 2000. —p. 36, 252). For instance, a fan blower generates air flow, while a turbojet blower generates gas flow which contains (along with air) other gaseous combustion products. In the following, for the purpose of clarity of the present object disclosure, air is taken to mean gas, because the cases of other gaseous working fluids, such as end gases (exhaust gases), are identical.

The air flow around the wing is a three-dimensional nonlinear process. The lifting force of the wing depends on its area, shape, platform shape, as well as on the angle of attack, air speed, viscosity and density, and on other physical factors. When a wing is moving in the air flow, the air layers interact with the wing upper and lower surfaces. The air flow moving along the wing upper surface gets attracted to it and moves along it even after the profile inflection due to the effect of viscosity forces, which is known as the Coanda effect (see, for example: 1) Loytsyansky, L. G., Fluid Mechanics.—Moscow: Drofa Publishing, 2003, 7th edition, p. 504-507; 2) Reba I., Wohlthausen E. Applications of the Coanda Effect//Scientific American, volume 214, June 1966, pp. 84-92 (http://www.laesieworks.com/ifo/how/Coanda_effect-P1.html)). The increase of the wing lifting force due to the Coanda effect is possible by virtue of the forced increase of the air flow rate on the wing upper surface.

One of the well-known is the aerodynamic device consisting of a Custer channel wing and a propeller engine (See: 1) Bowers P. Unconventional Aircraft/P. Bowers—Blue Ridge Summit, Pa.: 1990 (Eng).—Moscow: Mir, 1991 (Rus). pp. 137-138. 2) U.S. Pat. No. 2,691,494, Cl. 244-12, 10.06.1954). The Custer channel wing is a semi-circular airfoil of a channel or "half barrel" shape. Furthermore, in its section along the airflow, the channel wing has an aerodynamic contour. Above the Custer channel wing, there is a propeller engine, while the prop plane is located at the airfoil trailing edge. The propeller sucks the air into the channel creating the increase of the air flow rate above airfoil and thus increases the wing lifting force.

The closest analogous solution is an aerodynamic device in the form of a chute-type wing with a turbojet mounted on its front upper surface. This aerodynamic device was proposed in RU Patent No. 22288137, IPC B64C21/00, B64C3/00, 30.05.2005, according to which the chute-type wings are mounted underneath the fuselage. When the turbojet is working, the end gases are moving along the wing upper surface thus creating a low pressure area on the wing upper surface which results in additional wing lift.

The technical result of the well-known analogs with an unconventional wing, is creating the lifting force by employing the Coanda effect.

A common drawback of the above aerodynamic devices is underutilization of air viscosity and compressibility and insufficiently effective choice of the wing upper surface shape, which is interacting with the air flow and acts as an underlying surface in relation to the air flow, which results in low efficiency of the air flow power use, in reduced lifting force and in low efficiency of controlling the wing resultant forces.

SUMMARY OF INVENTION

An object of this invention is to develop a new aerodynamic device which can obviate the above drawbacks of conventional devices, increase efficiency of the air flow power use, increase the efficiency of the lifting force, and improve the efficiency of the wing resultant forces control process by virtue of:

1) improved efficiency of the air flow power utilization in the process of air flow around the wing due to reduced energy scattering in space by means of using air viscosity forces and compressibility;

2) improved efficiency of the underlying surface specific shape utilization for attached flow about the airfoil;

3) improved efficiency of utilizing the Coanda effect to increase the reaction force impulse projection value in the vertical direction, determined by the interaction between the structural components and the air flow;

4) improved efficiency of the wing resultant lifting forces control process by virtue of forces generated by the wing.

It is another object of the present invention to extend the range of aerodynamic devices for aviation through providing a new specific unconventional device.

For this purpose, the aerodynamic device has an aerodynamic wing with a gaseous working fluid (such as air) blower mounted above the wing and connected to the wing by mechanical components (or connecting system); in accordance with the invention, the aerodynamic wing has a specific form: the wing is designed in the form of a double-curved open surface made up by a system of longitudinal grooves along the entire wing surface and with a vertical longitudinal plane of symmetry. Along the trajectory of the gaseous working fluid flow, the wing has a convergent segment and a divergent segment; between the convergent and the divergent segments there is a smooth transitional segment. To prevent the air flowing from the lower surface to the upper surface, the wing outlines have end elements. In the convergent and the divergent segments of the wing lower surface which is not blown by air, there is a controlled drive system for the wing surface cambering and area changing. The divergent segment tip on the wing trailing edge has a deflectable controlled element whose purpose is similar to that of the conventional wing plain flap.

The structural parts of the present invention have the following distinguishing features. The system of longitudinal grooves consists of the central grooves provided in the wing central part and of the lateral grooves provided in the wing side parts. The central grooves go along the whole wing, starting from the convergent segment, continuing in the transition segment and finishing in the divergent segment. The lateral grooves start in the convergent segment and, depending on the position in relation to the wing vertical plane of symmetry, may end in the transitional segment or in the divergent segment, which is established by experiments or by calculation, depending on the specific purpose of the wing. The vertices of the central and lateral grooves are rounded, in so doing, the generatrix curvature radii r for the groove vertices are smaller than the generatrix curvature radii R for the groove lower parts (as is known, a generatrix is a line whose motion generates a surface). The number of the central and lateral grooves depends on the required (needed or necessary) wing area, which is determined in accordance with the specific purpose of the wing.

The central and lateral grooves are made on the wing underlying surface in such a way that the cross-sectional area of each groove along the flow is either constant or monotonically increasing. The convergent segment of the wing is actually a sectorial part of a symmetrical conical surface provided with grooves along the flow. The geometry variables and relationships for the convergent segment of the wing are characterized in that the opening angle of the whole sectorial part of the wing convergent segment $\gamma_k$ lies in the range from 150° to 220°. The relation between the sectorial angle of the central part of the wing convergent segment and the opening angle of the entire sectorial part of the wing convergent segment $\gamma_{kc}/\gamma_k$ lies in the range from 0.5 to 0.8. In the longitudinal plane of symmetry, the relation between the convergent segment length projected on the rolling axis of symmetry and the wing chord length with its maximum value $L_k/L_{max}$ lies in the range from 0.1 to 0.4. (As is known from Aerodynamics (see, for example: GOST 22833-77. Aircraft Geometry Variables), the wing chord length is equal to the distance between the points of the wing leading and trailing edges in the vertical plane of symmetry. From this definition follows the meaning of value $L_{max}$.). The wing transitional segment is actually a sectorial symmetrical double-curved saddle-shaped surface with longitudinal grooves. The transitional segment comprises the wing throat which has the minimum cross-sectional area and is perpendicular to the wing vertical longitudinal plane of symmetry. In the longitudinal plane of symmetry, the relation between the transitional segment length projected on the rolling axis of symmetry and the wing length chord with its maximum value $L_t/L_{max}$ lies in the range from 0.1 to 0.4. The divergent segment of the wing is actually a sectorial part of a symmetrical conical surface with longitudinal grooves. The divergent segment is made with a provision of the positive increment of the wing underlying surface area over the wing length, longitudinally along the flow. The opening angle of the entire sectorial part of the wing divergent segment $\gamma_d$ lies in the range from 150° to 220°. The relation between the sectorial angle of the wing divergent segment and the opening angle of the entire sectorial part of the wing divergent segment $\gamma_{dc}/\gamma_d$ lies in the range from 0.5 to 0.8. In the longitudinal plane of symmetry, the relation between the divergent segment length projected on the rolling axis of symmetry and the wing length chord with its maximum value $L_d/L_{max}$ lies in the range from 0.2 to 0.8. The wing section cambering and area changing result in changing the relation between the projected lengths of these sections and the chord value with its maximum value $L_{max}$; in so doing the particular relationship values lie within the above ranges. The deflection angle for the deflectable controlled element θ lies in the range from 0° to 40°.

The invention is illustrated, by way of example, in the accompanying scheme drawings which show one of the preferred embodiments of the invention. These drawings have sufficient detail for understanding the essence of the invention.

BRIEF DESCRIPTION OF DRAWINGS

The figures show an air blower 1, an aerodynamic wing 2, a connecting system 3 (in other words, these are mechanical elements 3, connecting the blower 1 with the wing 2), the wing convergent segment 4, the transitional segment 5, the wing divergent segment 6, central grooves 7, lateral grooves 8, the deflectable controlled element 9, the controlled drive system 10 for cambering and area changing of the wing transitional and divergent segments, the end elements 11. It should be noted that in the following, for the sake of clarity of the disclosure of the invention, each separate figure shows primarily only those device elements which are necessary for illustrating the essence of this or that part of the invention description (without extra elements which can be conceptually omitted).

FIG. 3 shows the shape of the aerodynamic wing 2, the central and lateral grooves 7 and 8, the deflectable controlled element 9, the end elements 11.

FIG. 4 shows the following values: aerodynamic chord L, which can be changed to the maximum value $L_{max}$; the convergent segment length projected on the longitudinal plane of symmetry $L_k$; the divergent segment length projected on the longitudinal plane of symmetry $L_d$; the transitional segment length projected on the longitudinal plane of symmetry $L_t$.

FIG. 5 shows the aerodynamic wing 2 (by the example of the wing with three central grooves 7 and two lateral grooves 8 on each side), the end elements 11.

FIG. 6 shows the following values: the generatrix curvature radius for vertices r, the generatrix curvature radius for the lower part of groove R, the opening angle for the whole sectorial part of the wing convergent segment $\gamma_k$, the sectorial angle of the central part of the wing convergent segment $\gamma_{kc}$, the sectorial angle of the lateral part of the wing opening angle $\gamma_{ks}$, the cross-sectional area of the central groove $S_{1k}$, the cross-sectional area of the lateral groove $S_{2k}$. It should be noted, that in FIG. 6 and further in the application materials, if the value symbols have additional superscripts <<i>> or <<j>>, they indicate the i-th or j-th grooves.

FIG. 7 shows the aerodynamic wing 2 (by the example of the wing with three central grooves 7 and two lateral grooves 8 on each side), the deflectable controlled element 9, the end elements 11.

FIG. 8 shows the following values: the generatrix curvature radius for vertices r, the generatrix curvature radius for the lower part of groove R, the opening angle for the whole sectorial part of the wing divergent segment $\gamma_d$, sectorial angle of the central part of the wing divergent segment $\gamma_{dc}$, the sectorial angle of the lateral part of the wing divergent segment $\gamma_{ds}$, the cross-sectional area of the central groove $S_{1d}$, the cross-sectional area of the lateral groove $S_{2d}$.

FIG. 9 shows the aerodynamic wing 2, the deflectable controlled element 9, the end elements 11.

FIG. 11, FIG. 12 and FIG. 13 show the controlled drive system 10 for wing divergent segment cambering and area changing.

FIG. 15 is an unmanned aircraft option.

MODES FOR CARRYING OUT THE INVENTION

The proposed aerodynamic device operates in the following way (FIG. 1-14).

Figure 1:
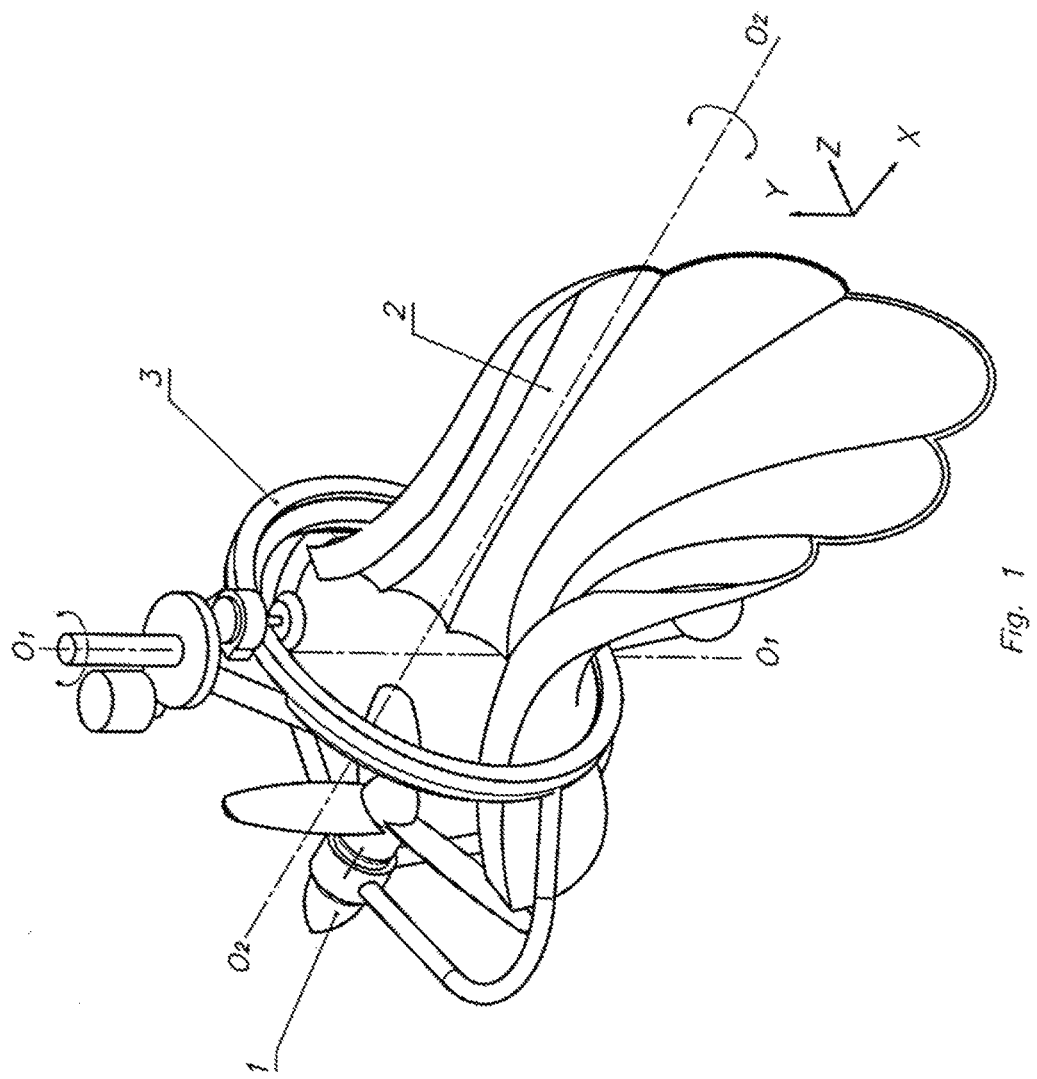
FIG. 1 and FIG. 2 are a structure of the whole device (FIG. 1 is a visual image of the device, FIG. 2 is the side view of the device) and its main elements: the propeller blower 1, the aerodynamic wing 2, the connecting system 3 (of mechanical type, connecting the blower 1 with the wing 2), the controlled drive system 10 for cambering and area changing of the wing transitional and divergent segments.
Figure 2:
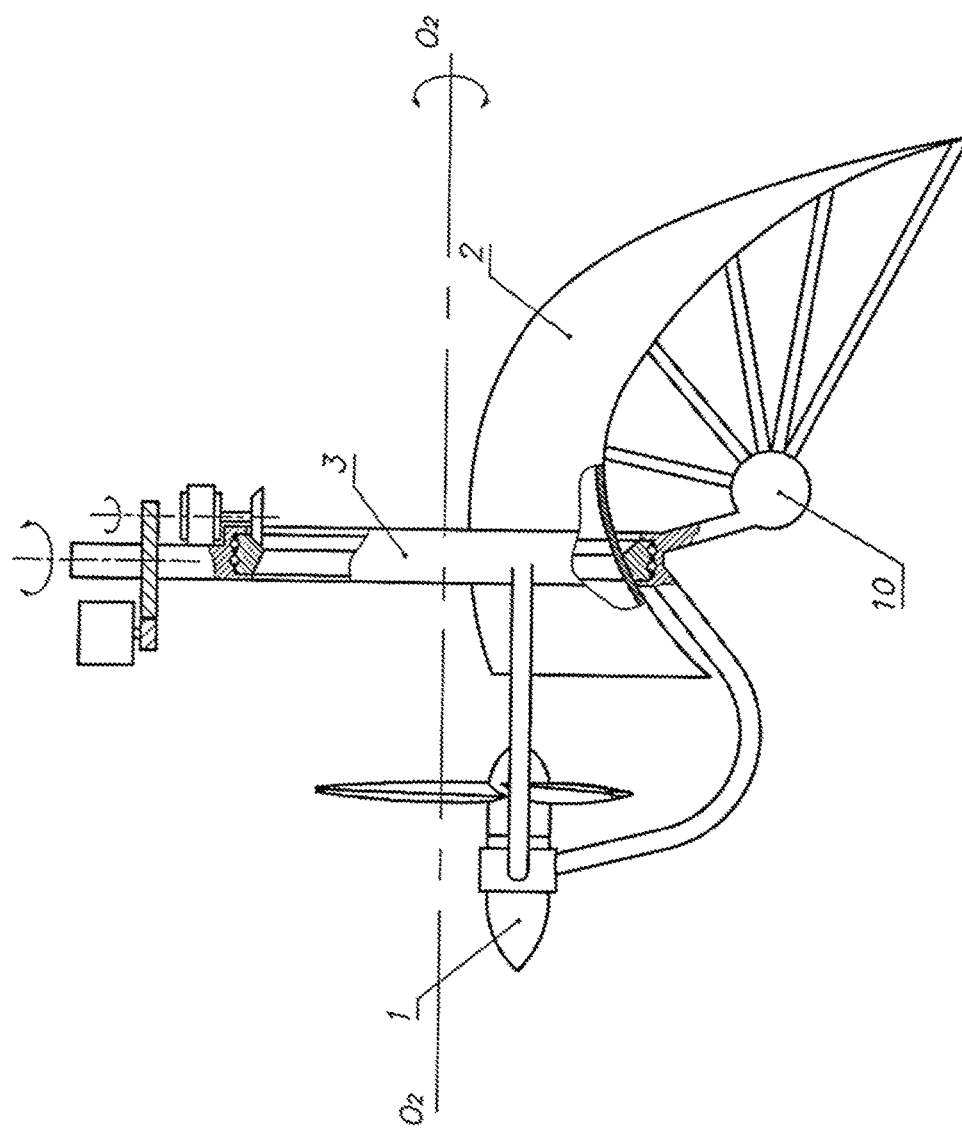
Figure 3:
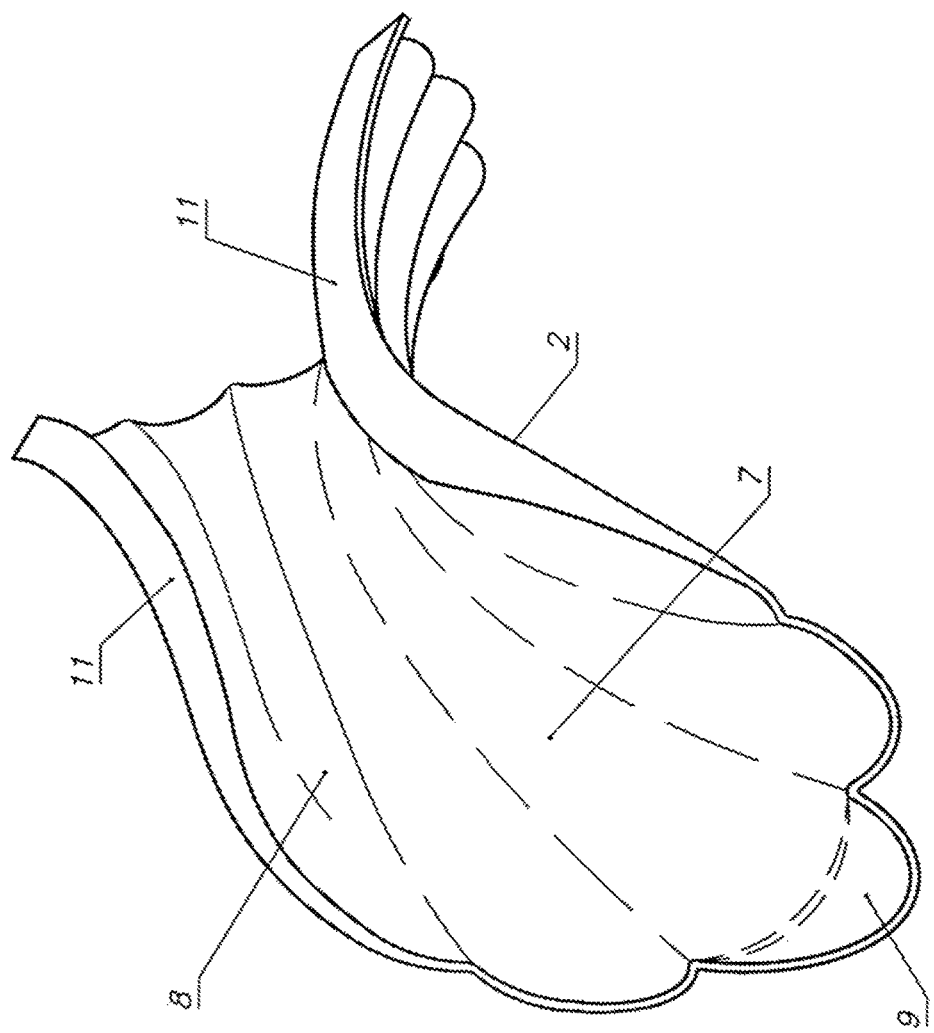
FIG. 3 is an aerodynamic wing, axonometric drawing.

From the blower 1 the flow passes above the aerodynamic wing 2 and interacts with the same (FIG. 1, FIG. 2). The aerodynamic flow from the blower 1 flows around the wing 2 only on the upper side. In this case, the wing 2 upper surface acts as the underlying surface in relation to the flow and the flow actively interacts with the underlying surface which is then defined as a viscous interaction underlying surface (hereinafter referred to as VIUS).

The occurrence of the aerodynamic lifting force is caused by the force interaction between the incoming gaseous working fluid (such as air) from the blower 1 and the wing 2 aerodynamic surface of a special shape. The high-energy flow of the gaseous working fluid can be generated by the work of a propeller, jet engine or rocket engine, an axial-flow or a radial-flow blower, etc.

When the air flow passes from the blower 1 to the wing convergent segment 4, the surrounding air particles are ejected by the high-energy air flow from the blower 1, which adds the number of air particles involved in flowing around the wing 2.

The underlying surface of the convergent segment 4, due to deflection and deceleration of the air flow from the blower 1, in immediate proximity to the wing 2 surface in the central part of the convergent segment 4, can create a high-pressure zone (as compared to the pressure at the periphery of the convergent segment 4). As has been shown by model-based exploratory tests, a high-pressure zone can cover from 0 (zero) to 30% of the convergent segment 4 surface area.

The air flow is distributed between grooves 7 and 8 of the convergent segment 4 and afterwards passes along grooves 7 and 8 toward the transitional segment 5. Due to a special shape of the convergent surface grooves, the particles move toward the transitional segment with simultaneous flow redistribution in such a way that the air flow gets attracted to the surface of the convergent segment 4 as a result of compressibility and viscous force effect in the flow of air particles.

The area of the high-pressure zone depends both on the air flow energy and the angle between the resultant velocity speed of the air flow from the blower 1 and the symmetry axis of the conical surface making the wing convergent segment 4. The optimum value of this angle maintains the most efficient "attraction" and holding of the flow to the VIUS, thus ensuring the attached flow of air particles toward the wing transitional segment 5.

Low-pressure zones occur on the VIUS of the transitional 5 and divergent 6 wing segments flown by the air flow; this determines the occurrence of forces of aerodynamic nature on the surface of wing 2.

The entire viscous interaction underlying surface (VIUS) of the aerodynamic wing is covered with grooves. The central part of the wing has central grooves 7, and the lateral parts of the wing have lateral grooves 8. The grooves on the aerodynamic wing have the following functions.

In the central grooves 7 the basic process of the interaction between the flow and the VIUS takes place. The lateral grooves 8 provide for keeping the air flow above the VIUS in the wing central part and perform the restrictive function. The central grooves 7 go along the whole length of the aerodynamic wing 2, starting from the convergent segment 4, continuing in the transitional segment 5 and finishing in the divergent segment 6. The grooves are made on the VIUS in such a way that the cross-sectional area of each groove along the flow motion is either constant or monotonically increasing. The lateral grooves 8 start in the convergent segment 4 and, depending on the position in relation to the wing 2 vertical plane of symmetry, may end in the transitional segment 5 or in the divergent segment 6, which is established by experiments or by calculation, depending on the specific purpose of the aerodynamic wing.

The structural components of the wing surface which are formed by the vertices of the adjacent grooves, cut the flow and direct the same along the wing generatrix thus increasing the VIUS area.

The vertices of the central and lateral grooves are rounded with the generatrix curvature radii for the groove vertices r are smaller than the generatrix curvature radii for the lower parts of the groove R.

The number and the shape of the central and lateral grooves depends on the required wing area, which is determined in accordance with the specific purpose of the wing.

The central and lateral grooves are made on the wing underlying surface in such a way that the cross-sectional area of each groove along the flow is either constant or monotonically increasing. The optimum shape and size of the central grooves 7 on the convergent segment 4 are determined by calculation (using numerical methods) and by experiments taking account various physical parameters (air flow rate, kinematic coefficient of air viscosity, etc.) and are established depending on the specific purpose of the aerodynamic wing.

The segments of the aerodynamic wing 2 are characterized as follows.

The convergent segment 4 of the wing is actually a sectorial part of a symmetrical conical surface provided with longitudinal grooves along the flow. The geometry variables and relationships for the convergent segment of the wing are given below.

Figure 6:
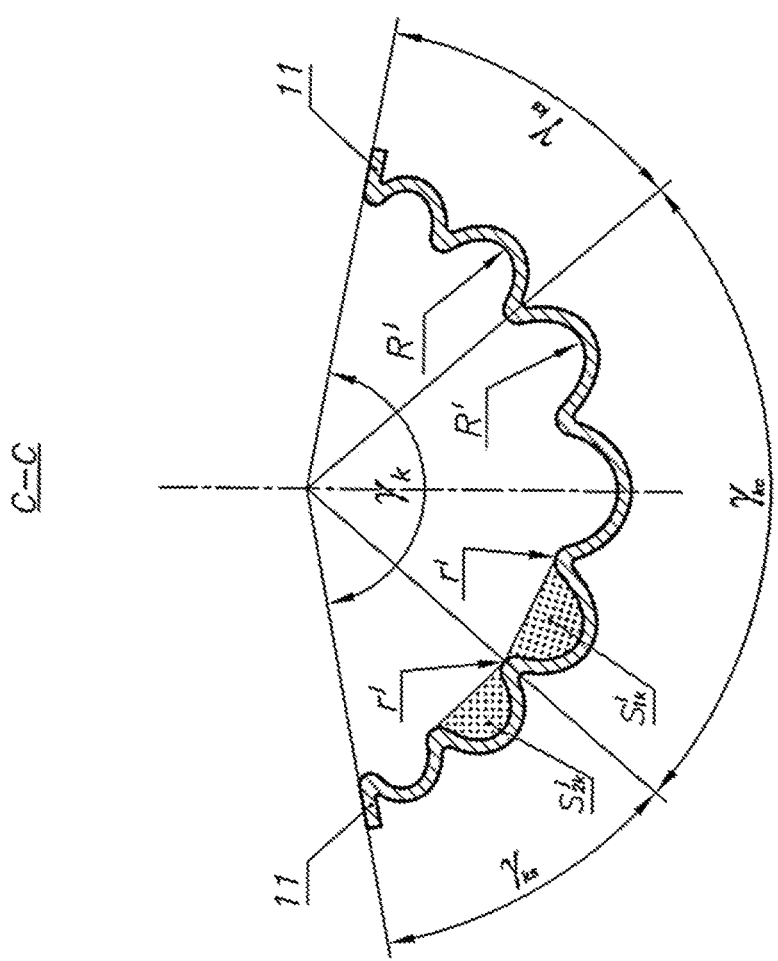
FIG. 6 is a section of the convergent segment C-C.
Figure 7:
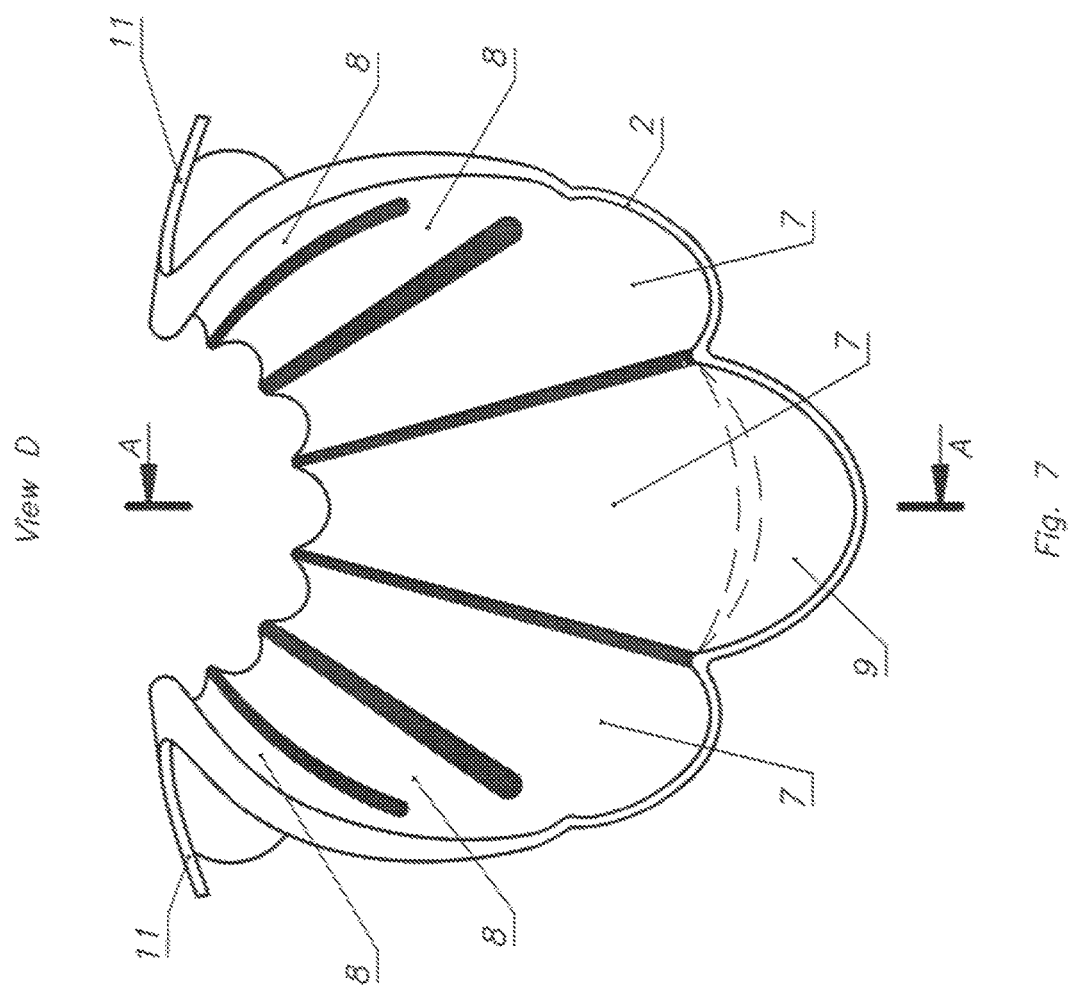
FIG. 7 is an aerodynamic wing, D view (the divergent segment view).

The opening angle of the entire sectorial part of the wing convergent segment $\gamma_k$ lies in the range from 150° to 220° (FIG. 6). The relation between the sectorial angle of the central part of the wing convergent segment and the opening angle of the entire sectorial part of the wing convergent segment $\gamma_{kc}/\gamma_k$ lies in the range from 0.5 to 0.8 (FIG. 6).

Figure 4:
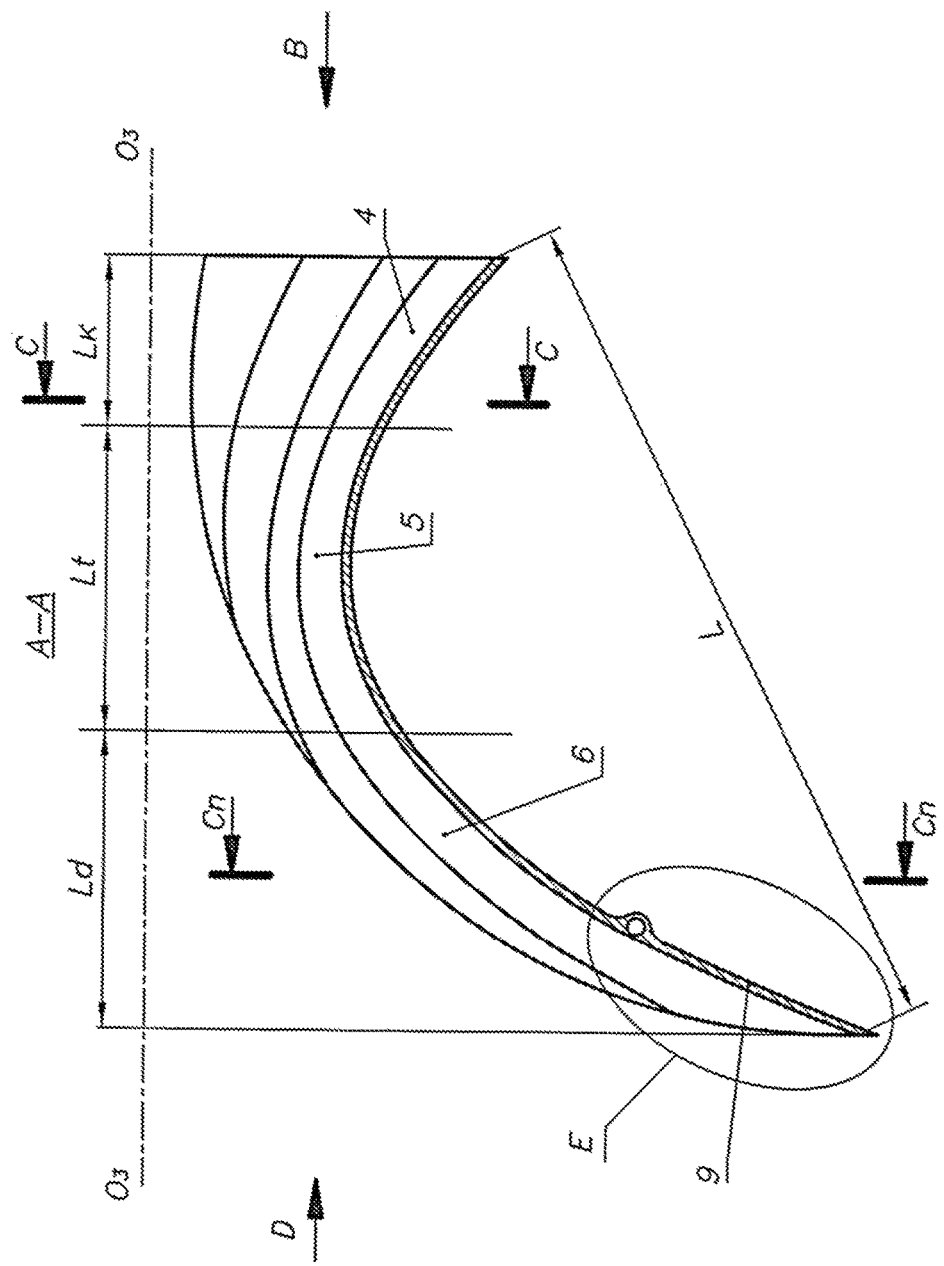
FIG. 4 is an aerodynamic wing, side view, with the longitudinal section A-A in the longitudinal plane of symmetry.
Figure 5:
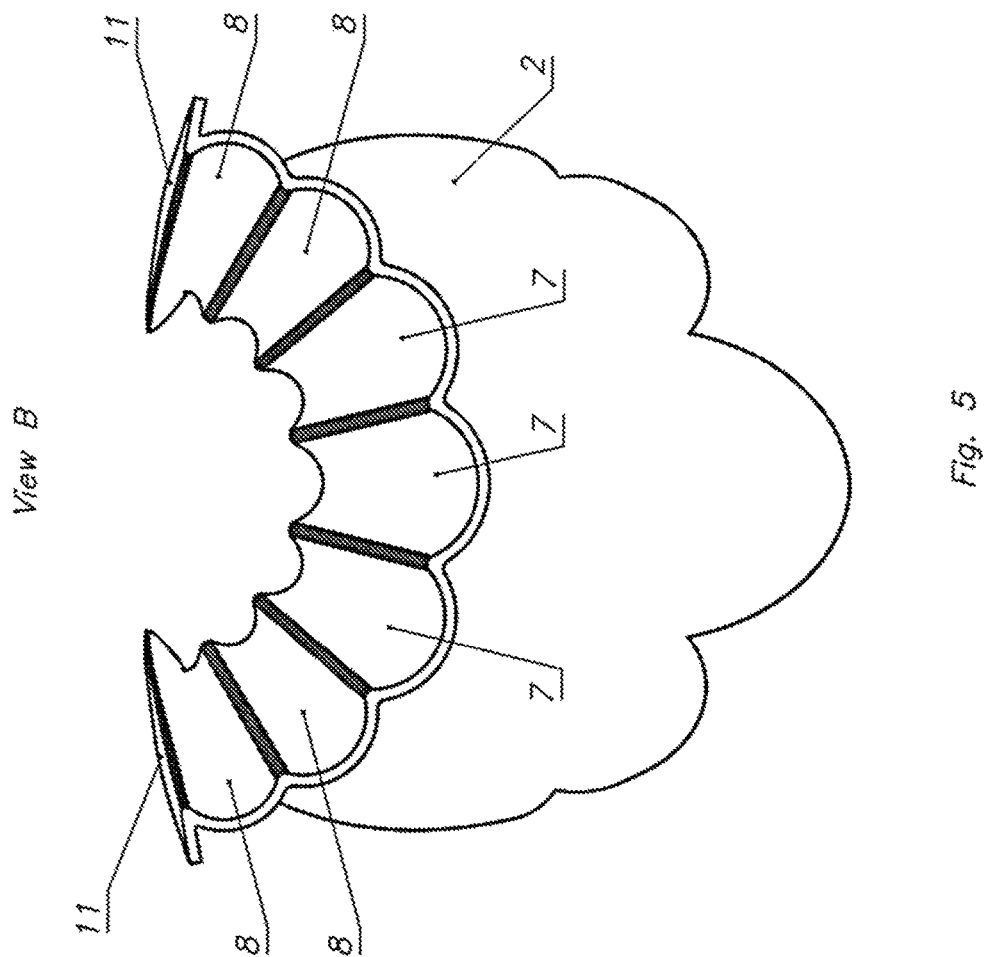
FIG. 5 is an aerodynamic wing, B view (convergent segment view).

In the longitudinal plane of symmetry, the relation between the convergent segment length projected on the rolling axis of symmetry and the wing chord length with its maximum value $L_K/L_{max}$ lies in the range from 0.1 to 0.4 (FIG. 4).

The transitional segment 5 serves for connecting the convergent 4 and divergent 6 wing segments. The wing transitional segment 5 is actually a sectorial symmetrical double-curved saddle-shaped surface. The transitional segment 5 is provided with longitudinal grooves along the flow. The lifting force arises at the transitional segment 5 of the aerodynamic surface. Moreover, the transitional segment 5 comprises the wing 2 throat which has the minimum cross-sectional area. The throat section is perpendicular to the wing 2 vertical longitudinal plane of symmetry. The lifting force arises at the transitional segment 5 of the aerodynamic surface. In the longitudinal plane of symmetry, the relation between the transitional segment length projected on the rolling axis of symmetry and the wing chord length with its maximum value $L_t/L_{max}$ lies in the range from 0.1 to 0.4 (FIG. 4).

The divergent segment 6 of the wing is actually a sectorial part of a symmetrical conical surface. It is also provided with longitudinal grooves along the air flow.

To ensure the continuous flow around the underlying surface, the divergent segment is made with a provision of the positive increment of the wing underlying surface area over the wing length, longitudinally along the flow. Meeting this condition can reduce the build-up rate of the boundary layer which contributes to separation of the flow from the surface.

The lifting force arises at the divergent segment 6 of the aerodynamic surface.

Figure 8:
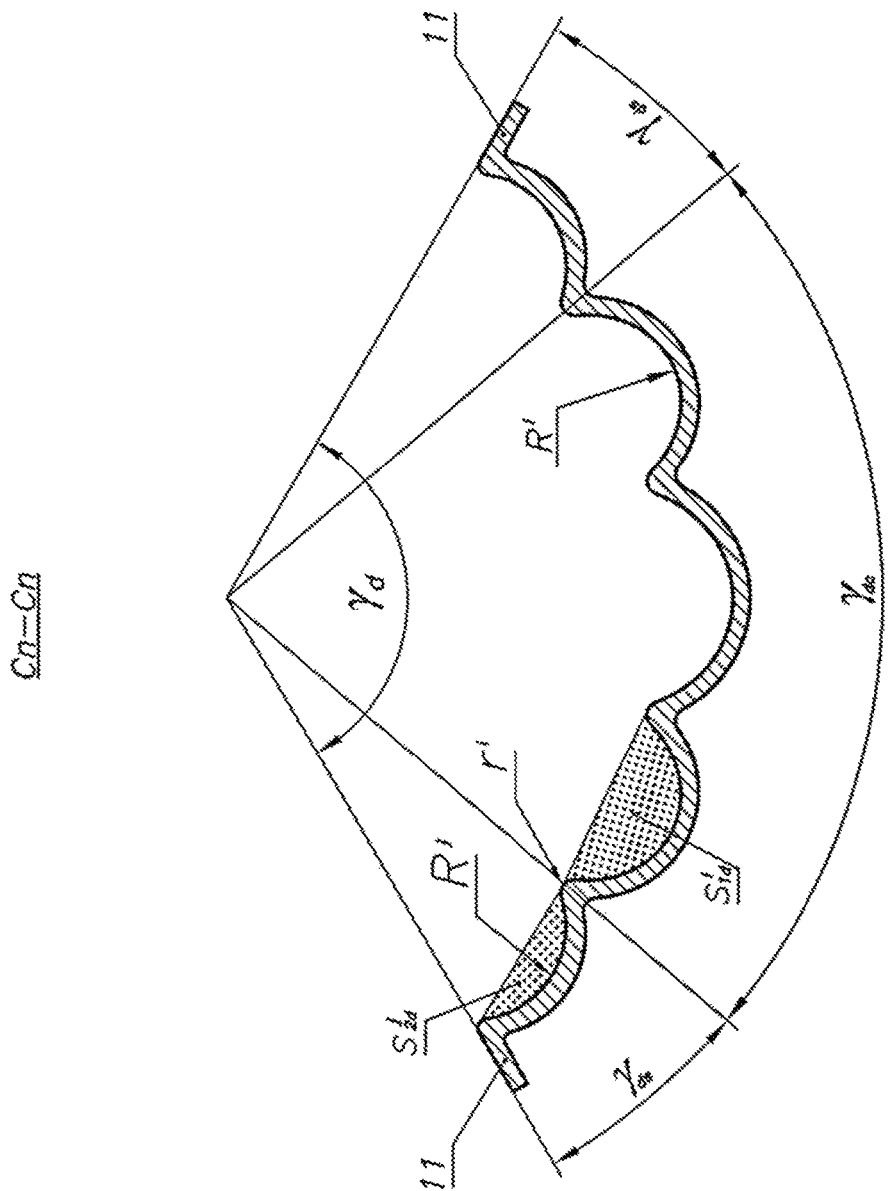
FIG. 8 is a section of the divergent segment $C_n$-$C_n$.
Figure 9:
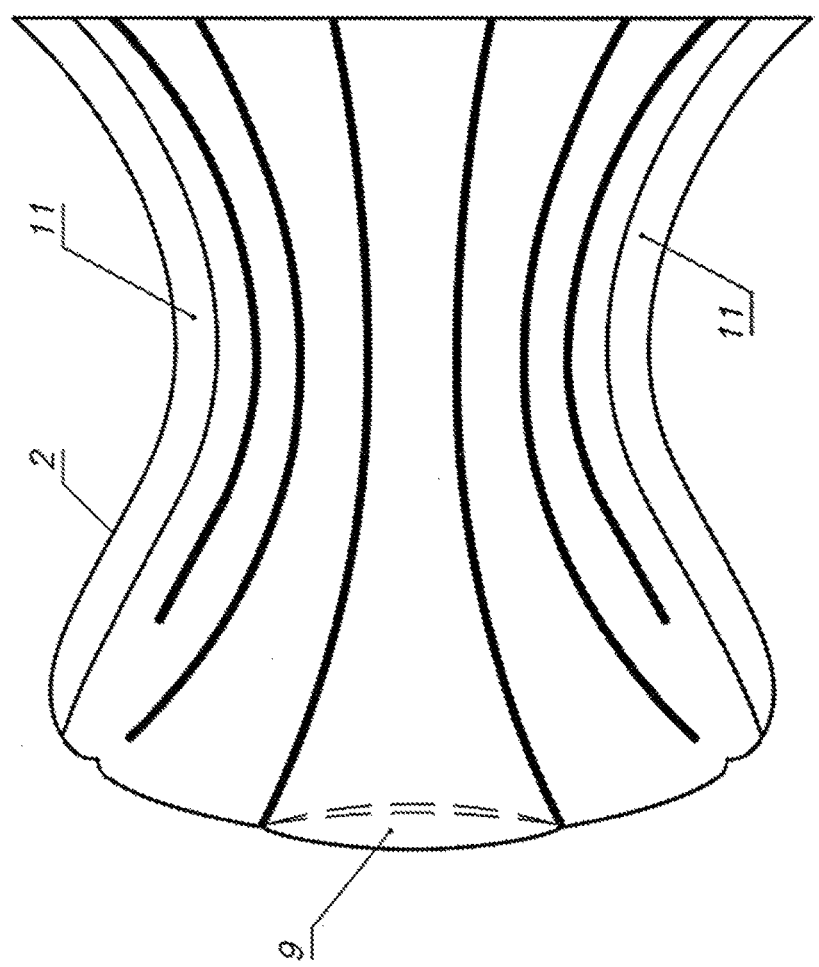
FIG. 9 is an aerodynamic wing, top view.
Figure 10:
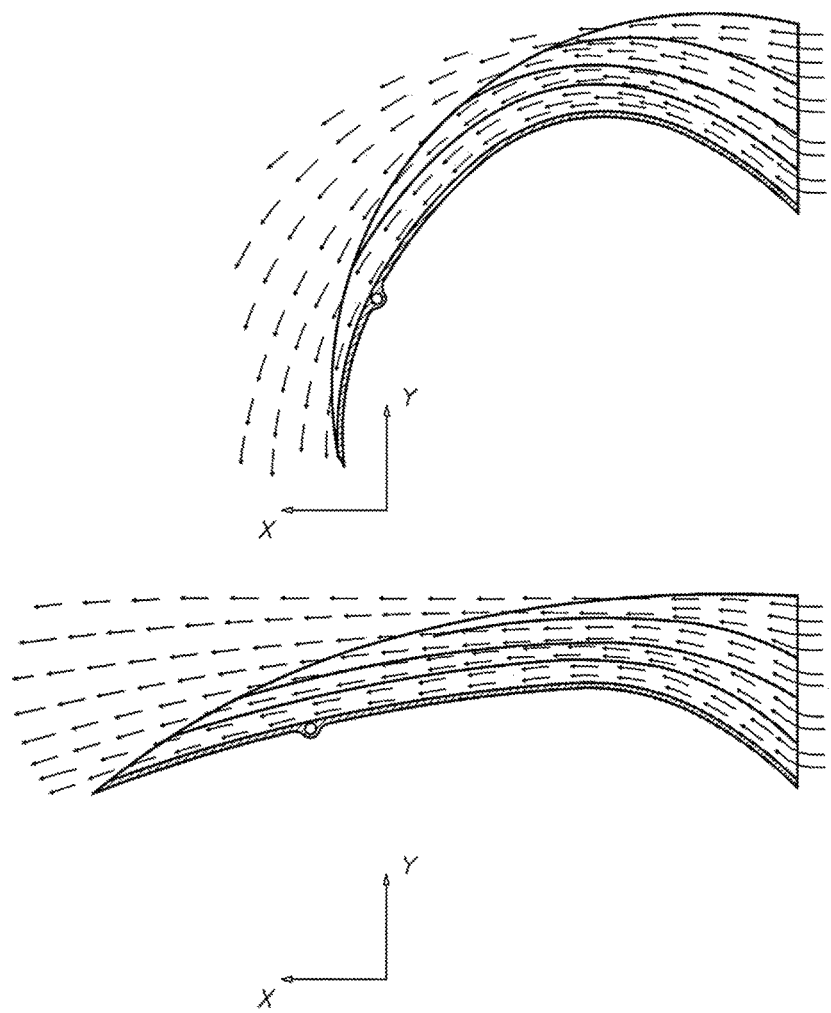
FIG. 10, FIG. 11, FIG. 12, FIG. 13 show the aerodynamic wing with different shapes of the divergent segment in the longitudinal plane of symmetry (the arrows show the movement of the particles of the air flow). In so doing.
Figure 11:
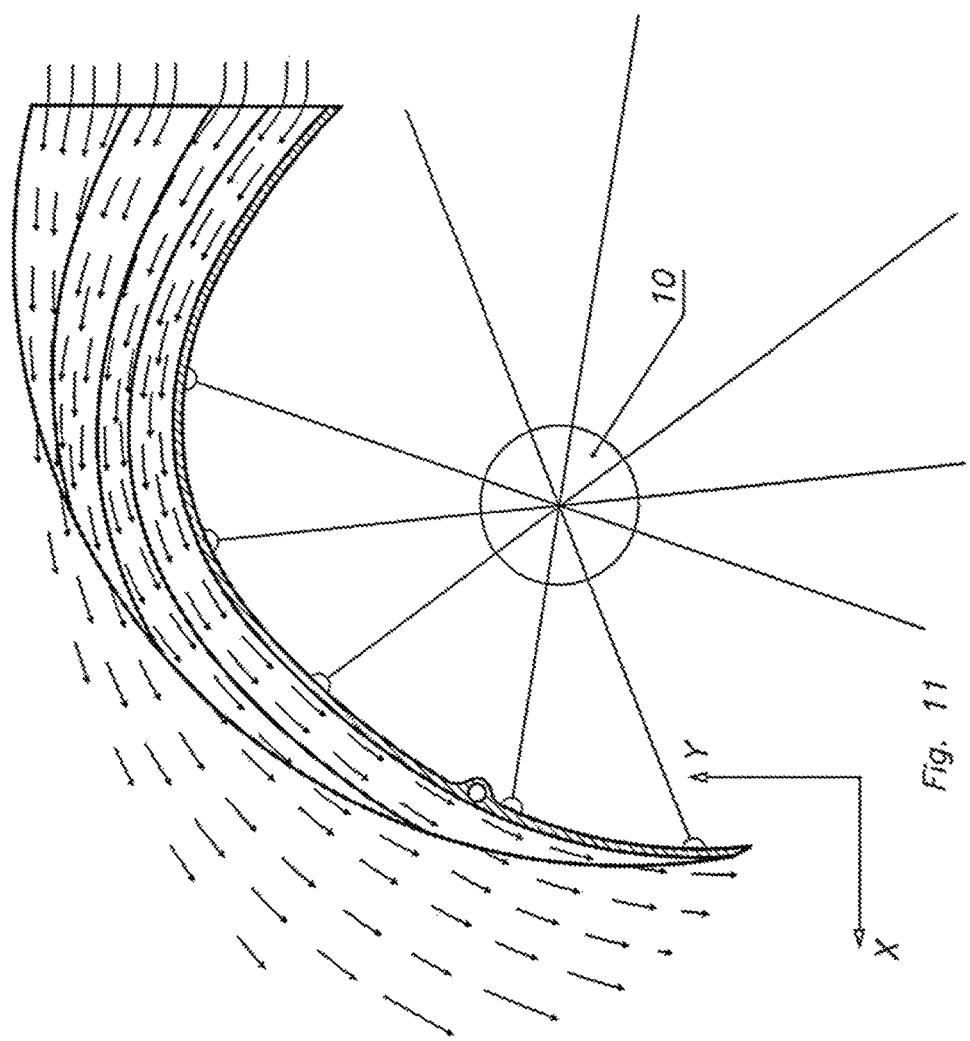
Figure 12:
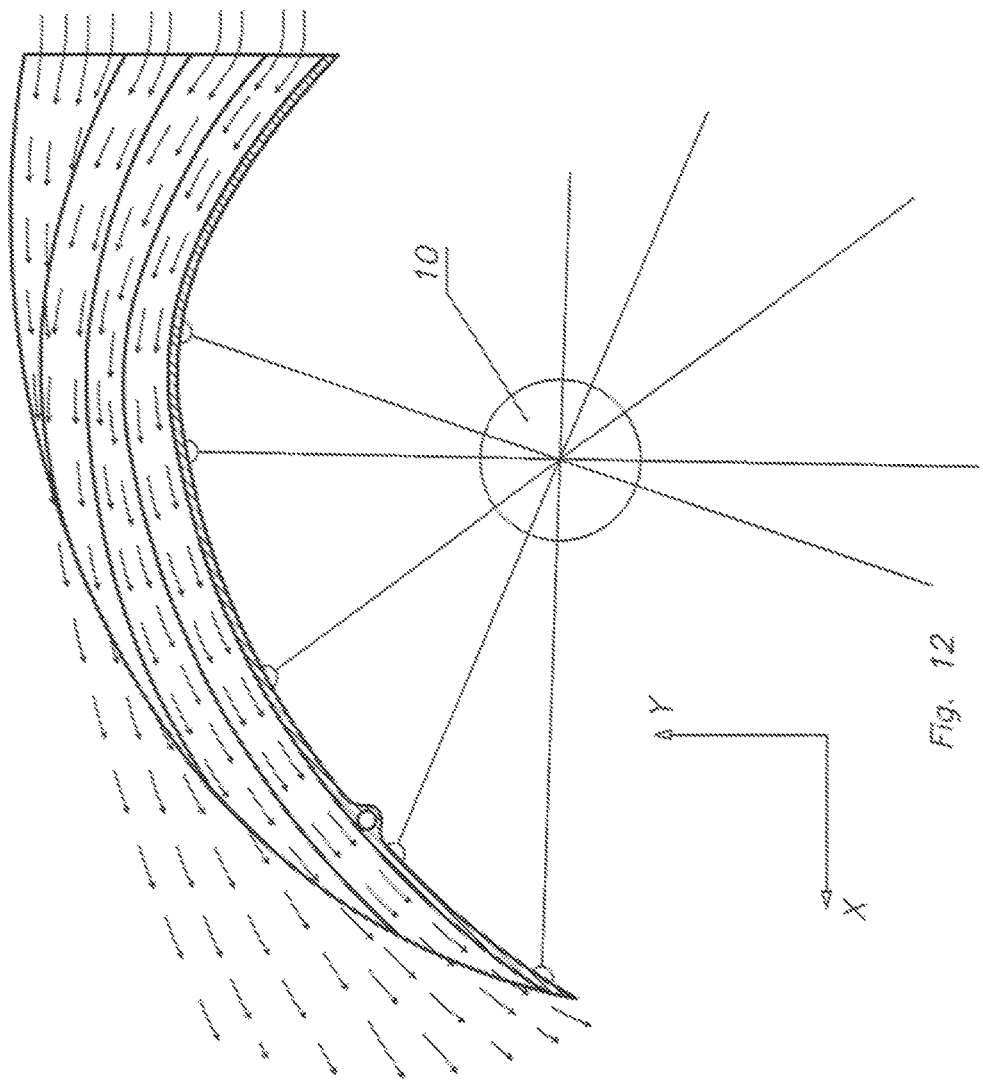
Figure 13:
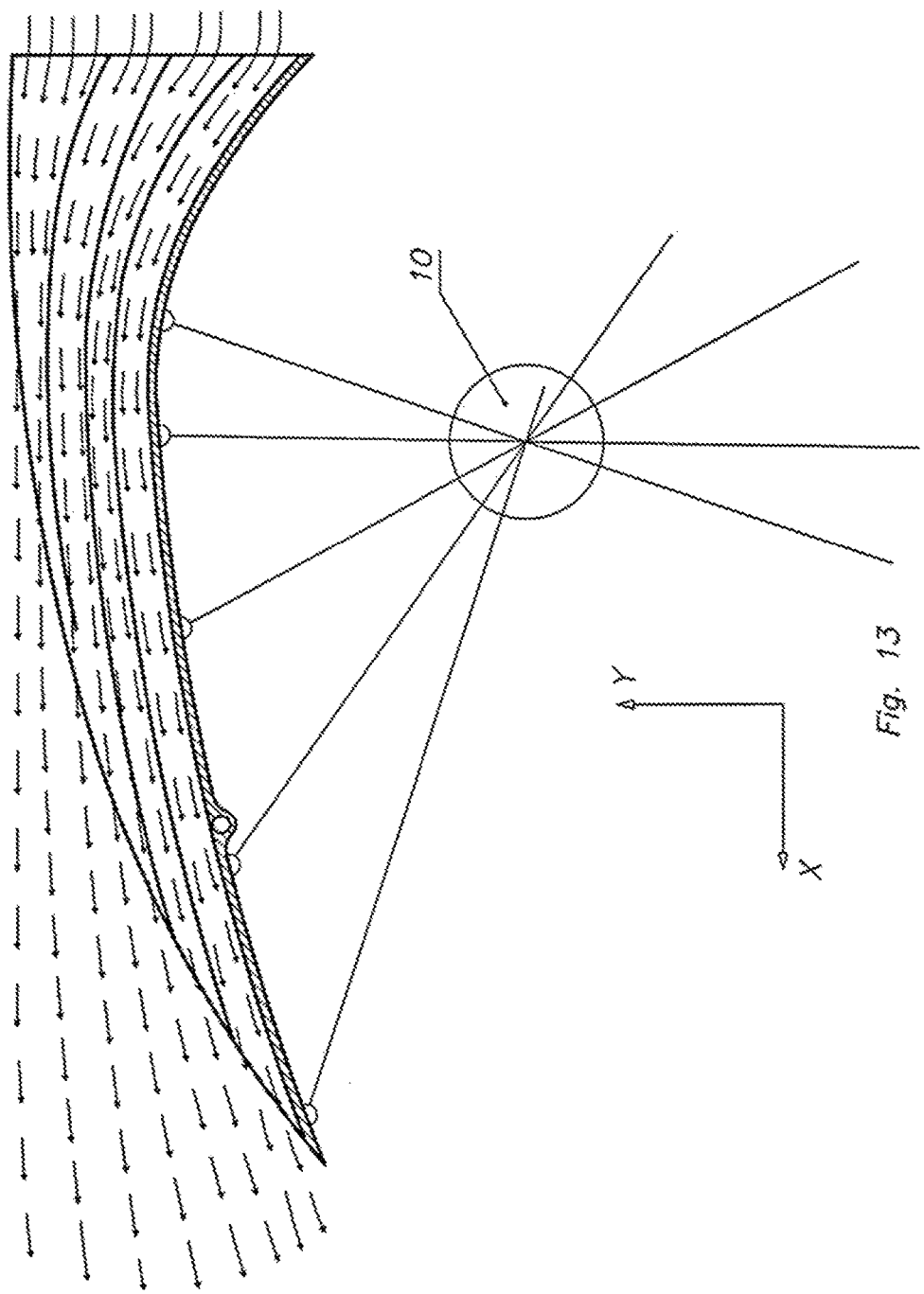

The opening angle of the entire sectorial part of the wing divergent segment $\gamma_d$ lies in the range from 150° to 220° (FIG. 8). The relation between the sectorial angle of the central part of the wing divergent segment and the opening angle of the entire sectorial part of the wing divergent segment $\gamma_{dc}/\gamma_d$ lies in the range from 0.5 to 0.8 (FIG. 8).

In the longitudinal plane of symmetry, the relation between the divergent segment length projected on the rolling axis of symmetry and the wing length chord with its maximum value $L_d/L_{max}$ lies in the range from 0.2 to 0.8 (FIG. 4).

The design of the divergent segment 6 of the wing 2 allows to change the direction of the retroactive force arising from the air flow jet coming off the surface of the divergent segment 6, as well as the direction and the magnitude of the total resultant aerodynamic force. This property of the wing 2 can be used for generating control forces and moments during flight control, for example, for an unmanned flying vehicle which could employ one or more proposed wings 2 (FIG. 15).

Cambering and area changing of the transitional segment 5 and the divergent segment 6 is achieved by a special design and/or by using special elastic and resilient materials. In the proposed device, the aerodynamic wing 2 is provided with a system of controlled drives 10 for the wing surface cambering and area changing, which ensures meeting the condition of the positive increment of the wing underlying surface area over the wing length, longitudinally along the flow, as well as for generating control forces and moments during various flight modes and conditions.

Figure 14:
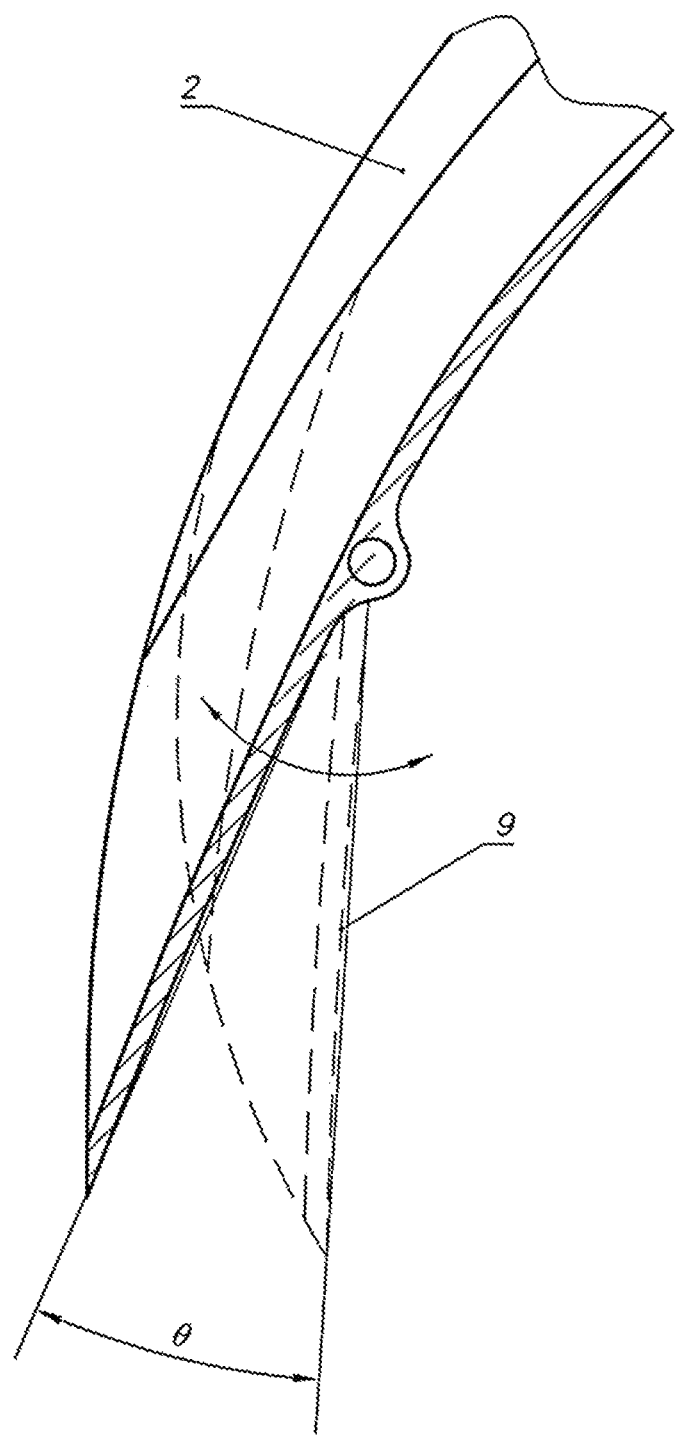
FIG. 14 is a deflectable controlled element 9 in various positions, θ is the deflection angle for the deflectable controlled element.

The divergent segment 6 tip on the wing trailing edge has a deflectable controlled element 9 which is responsible for increasing or decreasing the deflection of the air flow coming off the wing 2 in the vertical plane. The deflection angle θ for the deflectable controlled element 9 (the flap) lies in the range from 0° to 40° (FIG. 14). The deflectable controlled element 9 makes it possible to increase the wing lifting force during take-off.

Since the air flow around the wing is a three-dimensional nonlinear process and depends on a number of physical factors, it is impossible to foresee and justify optimisation of its design characteristics. Therefore, optimisation of some of the proposed design characteristics was carried out by means of the conventional design-theoretical methods and model tests established in fluid mechanics (Encyclopedic Dictionary of Physics/ed. by A. M. Prokhorov. —Moscow: Sovetskaya Entsiklopedia, 1983. —928 p.; Krasnov, N. F., Aerodynamics. Part I. Theoretical Framework. Airfoil and Wing Aerodynamics. Technical college textbook.—Moscow, Vysshaya Shkola, 1976.—384 p.; Krasnov, N. F., Aerodynamics. Part II. Aerodynamics Technology. Textbook for technical college students. —3rd edition, revised and enlarged. —Moscow, Vysshaya Shkola, 1980. —416 p.). In so doing, it was found that the proposed ranges are optimal. In other cases, beyond these optimal ranges, the efficiency of utilizing the airflow power normally used for generating the wing resultant lifting force, declines by at least 10%.

Due to the special wing shape and to the blowing of the wing upper surface by the blower, the proposed device makes it possible to design various aircrafts with one or more special-shape wings, as well as to combine conventional wings in the aircraft design. For instance, it is possible to develop unmanned aircrafts performing vertical take-off and landing as well as level flight (FIG. 15).

The invention claimed is:

1. An aerodynamic device, comprising:
a wing having a form of a double-curved open surface made up by at least three longitudinal grooves along the surface of the wing, the wing comprising:
a convergent wing segment;
a divergent wing segment, wherein at least one of convergent wing segment and divergent wing segment is positioned along a trajectory of fluid flow;
a fluid blower, connected to the wing; and
a controlled drive mechanism, connected to an area of the wing not engaged by air flow, wherein the controlled drive mechanism is connected to the wing on the opposite side of the fluid blower;
wherein the controlled drive mechanism is configured to allow at least one of cambering and area changing of a surface of the wing.

2. The aerodynamic device of claim 1, wherein the wing comprises a transitional segment between the convergent segment and the divergent segment.

3. The aerodynamic device of claim 1, wherein the controlled drive mechanism is positioned in at least one of the transitional segment and the divergent segment on the wing.

4. The aerodynamic device of claim 1, wherein wing outlines have end elements capable of preventing air flow onto a predefined surface of the wing.

5. The aerodynamic device of claim 1, wherein the at least three longitudinal grooves have a longitudinal plane of symmetry.

6. The aerodynamic device of claim 5, wherein the at least three longitudinal grooves comprise central grooves in a central part of the wing and lateral grooves in a lateral part of the wing, wherein the central grooves pass from the convergent wing segment and to the divergent wing segment, and wherein the lateral grooves pass from the convergent wing segment and pass to the divergent segment.

7. The aerodynamic device of claim 6, wherein vertices of the central and lateral grooves are rounded, with a generatrix curvature radii for the groove vertices being smaller than the generatrix curvature radii for the groove lower parts.

8. The aerodynamic device of claim 6, wherein the number of the central and lateral grooves corresponds to a predetermined wing area.

9. The aerodynamic device of claim 6, wherein at least one of the central and the lateral grooves is made on the wing underlying surface in such a way that a cross-sectional area of each groove along the flow is either constant or monotonically increasing.

10. The aerodynamic device of claim 6, wherein the divergent wing segment is a sectorial part of a symmetrical conical surface with longitudinal grooves, wherein an opening angle of a sectorial part of the divergent wing segment $\gamma_d$ being in the range $150° < \gamma_d < 220°$, wherein the relation between the sectorial angle of the divergent wing segment $\gamma_{dc}$ and an opening angle of the sectorial part of the wing divergent segment $\gamma_d$ being in the range $0.5 < \gamma_{dc}/\gamma_d < 0.8$, and wherein the relation between the length of the divergent segment projected on a rolling axis of symmetry $L_d$ and the length of a wing chord with its maximum value $L_{max}$ being in the range $0.2 < L_d/L_{max} < 0.8$.

11. The aerodynamic device of claim 6, wherein the convergent wing segment is a sectorial part of a symmetrical conical surface provided with grooves along the flow.

12. The aerodynamic device of claim 11, wherein geometry variables for the convergent wing segment of the wing comprise an opening angle, $\gamma_k$ of a sectorial part of the convergent wing segment being in the range $150° < \gamma_k < 220°$, wherein the relation between the sectorial angle of the central part of the convergent wing segment $\gamma_{kc}$ and the opening angle of the sectorial part of the wing convergent segment $\gamma_k$ being in the range $0.5 < \gamma_{kc}/\gamma_k < 0.8$, and wherein the relation between the length of the convergent wing segment projected on a rolling axis of symmetry $L_k$ and the length of a wing chord with its maximum value $L_{max}$ being in the range $0.1 < L_k/L_{max} < 0.4$.

13. The aerodynamic device of claim 6, wherein the wing comprises a transitional segment between the convergent and the divergent segments, and wherein the lateral grooves start from the convergent wing segment and pass to the transitional segment.

14. The aerodynamic device of claim 13, wherein the wing transitional segment is a sectorial symmetrical double-curved surface with longitudinal grooves, wherein the transitional segment comprises a wing throat having a minimal cross-sectional area and is perpendicular to the wing vertical longitudinal plane of symmetry.

15. The aerodynamic device of claim 14, wherein the relation between the transitional segment length projected on a rolling axis of symmetry $L_t$ and a wing chord length with its maximum value $L_{max}$ being in the range $0.1 < L_t/L_{max} < 0.4$.

* * * * *